United States Patent [19]

Hoffman et al.

[11] Patent Number: 4,683,758
[45] Date of Patent: Aug. 4, 1987

[54] DEVICE FOR MEASURING STRESSES IN VACUUM DEPOSITION COATINGS

[75] Inventors: David W. Hoffman, Ann Arbor; Cassimer M. Kukla, Taylor, both of Mich.

[73] Assignee: Ford Motor Company, Dearborn, Mich.

[21] Appl. No.: 819,444

[22] Filed: Jan. 16, 1986

[51] Int. Cl.⁴ .............................................. G01N 3/00
[52] U.S. Cl. ..................................... 73/780; 361/280
[58] Field of Search ................. 73/760, 763, 769, 774, 73/775, 776, 780, 718, 724, 1 R; 361/283, 280; 331/65; 204/192 R, 298

[56] References Cited

U.S. PATENT DOCUMENTS

| | | | |
|---|---|---|---|
| 2,920,480 | 1/1960 | Haas | 73/787 |
| 3,184,188 | 5/1965 | Rossire | 244/194 |
| 3,602,041 | 8/1971 | Weinert | 73/116 |
| 3,897,324 | 7/1975 | Del Monte et al. | 204/298 |
| 3,943,758 | 3/1976 | Wolf et al. | 73/767 |
| 4,079,508 | 3/1978 | Nunn | 29/580 |
| 4,261,086 | 4/1981 | Glachino et al. | 29/25.41 |
| 4,277,814 | 7/1981 | Giachino et al. | 361/283 |
| 4,377,851 | 3/1983 | McNamara | 304/571 |
| 4,386,453 | 6/1983 | Giachino et al. | 29/25.41 |
| 4,446,447 | 5/1984 | McNamara | 331/42 |
| 4,525,264 | 6/1985 | Hoffman | 204/298 |

OTHER PUBLICATIONS

Behrndt, "Physics of Thin Films", 1966, pp. 24–25, Edited by George Hass et al., U.S. Army Elec. Comm., Fort Belvoir, VA.
Paesler et al., "Measurement of Internal Stress in Thin Films", 1974, pp. 114–115, Rev. Sci. Instrum., vol. 45, No. 1.
Stuart, Some Measurements of Stress in Thin Films Prepared by Low Pressure Triode Sputtering, 1969, Pergamon Press Ltd., Vacuum, vol. 19, No. 11.
Stresses in Envaporated Dielectric Films, Blackburn & Campbell, Trans., 8th Nat'l Vacuum Symposium Z, 1961, p. 943.
Ionic Systems Stress Gauge Broucher.
Mechanical Properties of and Cracks and Wrinkles in Vacuum-Deposited MgFz Carbon and Boron Coatins, Kinbara et al., Thin Solid Films, 84, 1981, pp. 205–212.
Mar., 1975, U.S. Atomic Energy Commission Contract No. AT 11-1-623 Technical Report No. 82.
Physics of Nonmetallic Thin Films—1976—, "Mechanical Properties of Non-Metallic Thin Films" R. W. Hoffman–pp. 273 & 292.

Primary Examiner—Stewart J. Levy
Assistant Examiner—Robert R. Raevis
Attorney, Agent, or Firm—Paul K. Godwin, Jr.; Clifford L. Sadler

[57] ABSTRACT

In measuring stresses present in material coatings deposited by sputtering, a pressure transducer is used as an in-situ sensor. The transducer has a flexible conductive surface clamped about its periphery to a rigid substrate and forms a variable capacitor with a relatively rigid conductor across an underlying evacuated chamber. A mask element having an aperture that covers an area confined within the boundary defined by the underlying evacuated space is located adjacent the flexible conductive surface to limit the exposed surface area to receive sputtered material coating. Electronic circuitry monitors changes in the capacitance of the sensor and reflects the stress types and values attributed to each coating.

8 Claims, 5 Drawing Figures

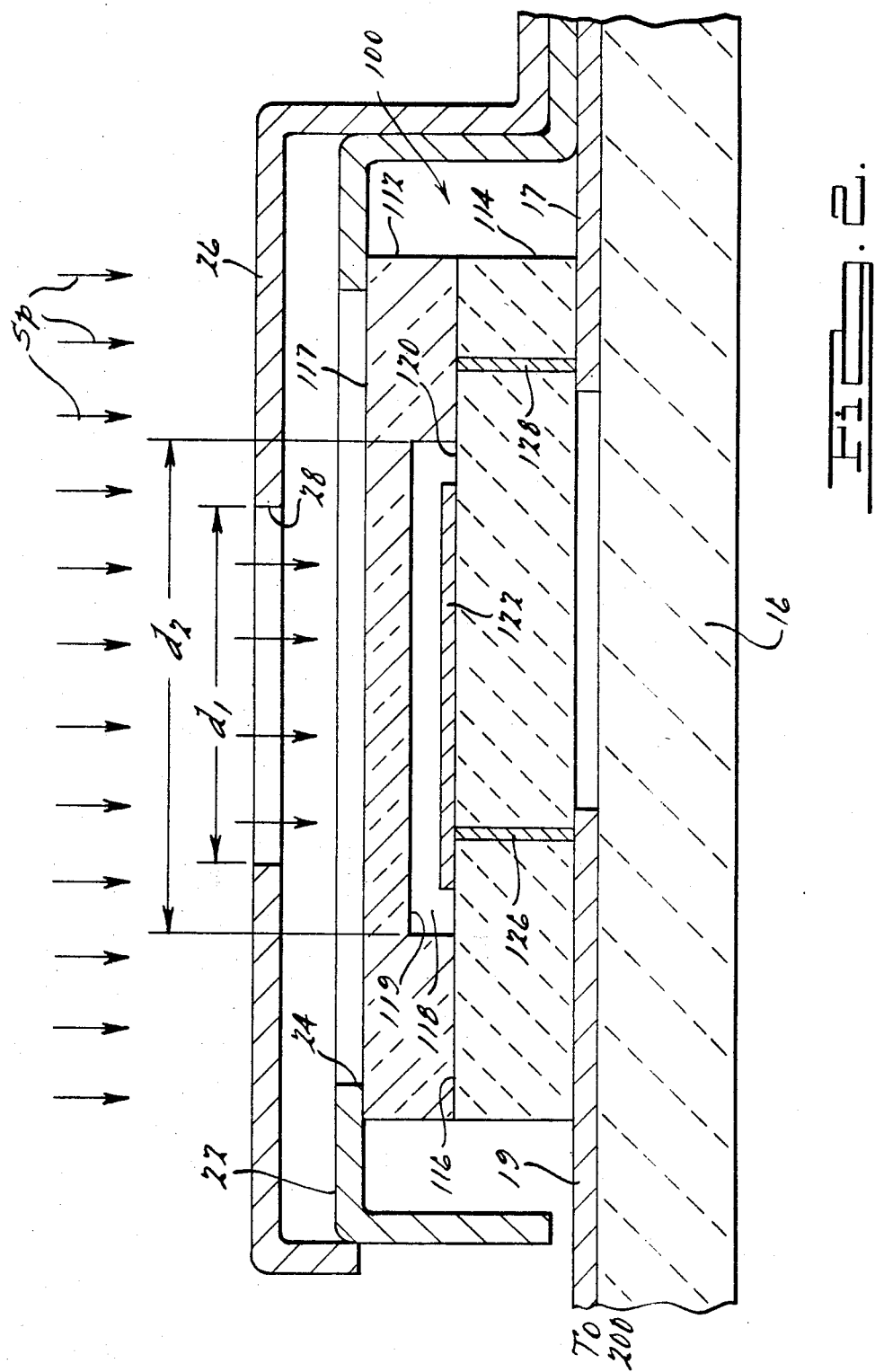

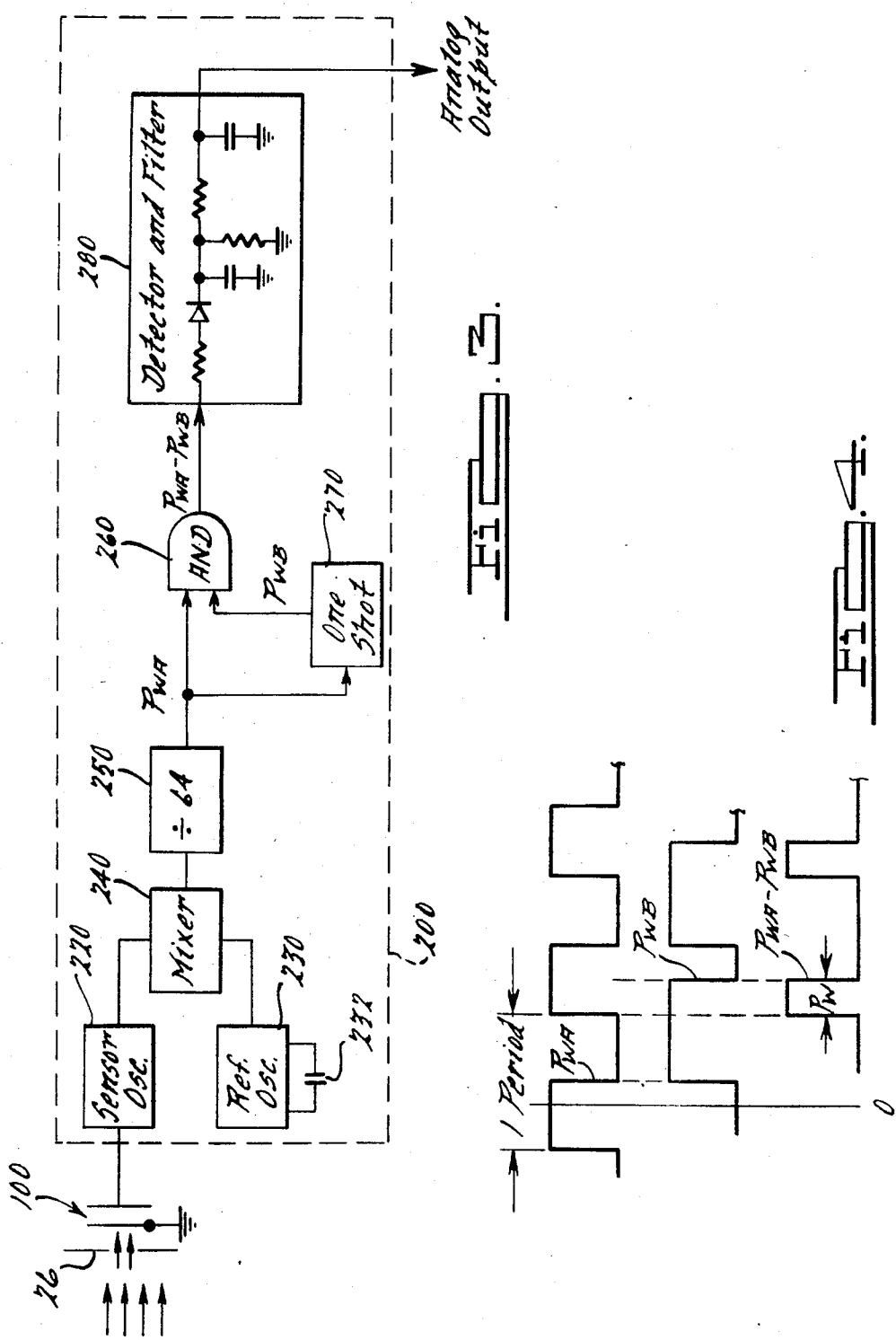

DEVICE FOR MEASURING STRESSES IN VACUUM DEPOSITION COATINGS

BACKGROUND OF THE INVENTION

1. Field of the Invention

The present invention is directed to the field of devices used for measuring stress build up in vapor deposition coatings and more specificially to the area of measuring such coatings utilizing a capacitive sensor.

2. Description of the Prior Art

In applying metal or dielectric coatings to work pieces by the use of sputtering systems, such as the one shown in commonly assigned U.S. Pat. No. 4,525,264 (incorporated herein by reference), it has been found that some degree of residual stresses remain in the coating. The detection and control of such coatings stresses or "film stresses" is seen as highly desirable in order to prevent resulting failures or unwanted effects in the coatings. By being able to sense the occurrance, strength and type of internal stresses developed in vapor deposited material coatings, one may thereafter control subsequent coatings by making appropriate changes in the process. For instance, by lowering the gas pressure or raising the discharge current in a sputtering system one can reverse the stresses in subsequent coatings from tensile to compressive.

One of the principle conventional ways of assessing the stress effects produced by diffeent vapor process conditions involves the generation of individual samples of coatings at each distinct setting of the various process parameters. The individual samples receiving sputtered material coatings comprise relatively thin substrates so that residual film stresses can be determined by observation. The thin substrates have a resultant curvature based upon the type and amount of stresses within the film coating. Film stresses are determined in this method by removing the coated samples from the deposition chamber for subsequent examination.

Conventionally, in-situ measurements of stress forces present in thin films prepared by sputtering techniques utilize a "cantilever" method, whereby a thin conductive substrate or plate is rigidly clamped at only one end and oriented in a position so as to receive the sputtered material. A rigidly mounted and nonmoveable reference electrode is positioned nearby the free end of the cantilevered conductive substrate so that the substrate and the electrode serve as a capacitor having a value of capacitance which varies according to the spacial distance between the two. Typically, in this prior art method, the cantilevered substrate receives a coating of material and bends either towards the rigid electrode or away from the rigid electrode depending upon the stresses present to cause such deflection. Changes in capacitance are electrically sensed and provide an indication as to the stress levels.

The cantilever measurement technique provides relative measurement from on coating to the other. However, due to the mechanical instabilities present in the set up, it is only suitable for laboratory use under ideal conditions. For instance, its use would be difficult in an industrial application where the coating quality is periodically sampled to determine stress levels of coating materials being sputtered on the surface of production parts. This is especially true where vibrations are present which would cause variations in the readings.

SUMMARY OF THE INVENTION

The present invention provides an improved device for measuring stresses in thin films. The device employed is a sealed capacitive pressure sensor having one relatively rigid substrate with a relatively flexible conductor element bonded at its perimeter to the rigid substrate. An evacuated chamber is defined between the relatively flexible element and the relatively rigid substrate. Sputtered materials are deposited on the relatively flexible element within a defined area overlying the evacuated chamber. Stresses present in the deposited material cause deformation to take place on the relatively flexible element and thereby cause a change in sensor capacitance. Appropriate circuitry is employed to measure the changes in capacitance and provide an output signal that reflects the amount and type of stresses present in each coated film.

A masking element is employed between the relatively flexible element of the sensor and the sputtering source so as to define and limit the area in which the material from the source will be sputtered onto the exposed surface of the relatively flexible element. While the evacuated chamber underlying the relatively flexible element defines a particular peripheral area, the mask serves to limit the area of deposition to an area which is within the boundaries defined by the periphery of the underlying chamber. In this manner, even though the flexible element is clamped about its periphery to the relatively rigid substrate, measurable deformation is achieved by the use of the mask. The deformation, of course, causes variations in the dielectric and the capacitance value of the sensor and is substantially unaffected by vibrations.

It is, therefore, an object of the present invention to provide an improved technique for measuring the stresses present in material coatings deposited by a vapor deposition process.

It is another object of the present invention to provide an accurate and sensitive device for measuring the stresses present in vapor deposited coatings by utilizing commercially available and interchangeable capacitance sensors.

It is a further object of the present invention to provide a unique sensor element which is ideally suitable for use in production vapor deposition processes to periodically sample and measure the stresses present in each coating deposited over a predetermined time period.

BRIEF DESCRIPTION OF THE DRAWINGS

FIG. 2 is an elevational cross-section of the sensor employed in the present invention.

FIG. 3 is a schematic diagram illustrating the associated circuitry employed with the sensor of the present invention.

FIG. 4 is a set of waveform diagrams illustrating the relationship of a plurality of signals occurring within the circuit shown in FIG. 3.

DETAILED DESCRIPTION OF THE PREFERRED EMBODIMENT

The desirability of measuring stresses present in vapor deposited coatings, such as metal, is achieved through the use of the present invention in-situ of the low pressure chamber such as that described in the commonly assigned U.S. Pat. No. 4,525,264, mentioned above.

Figure 1:
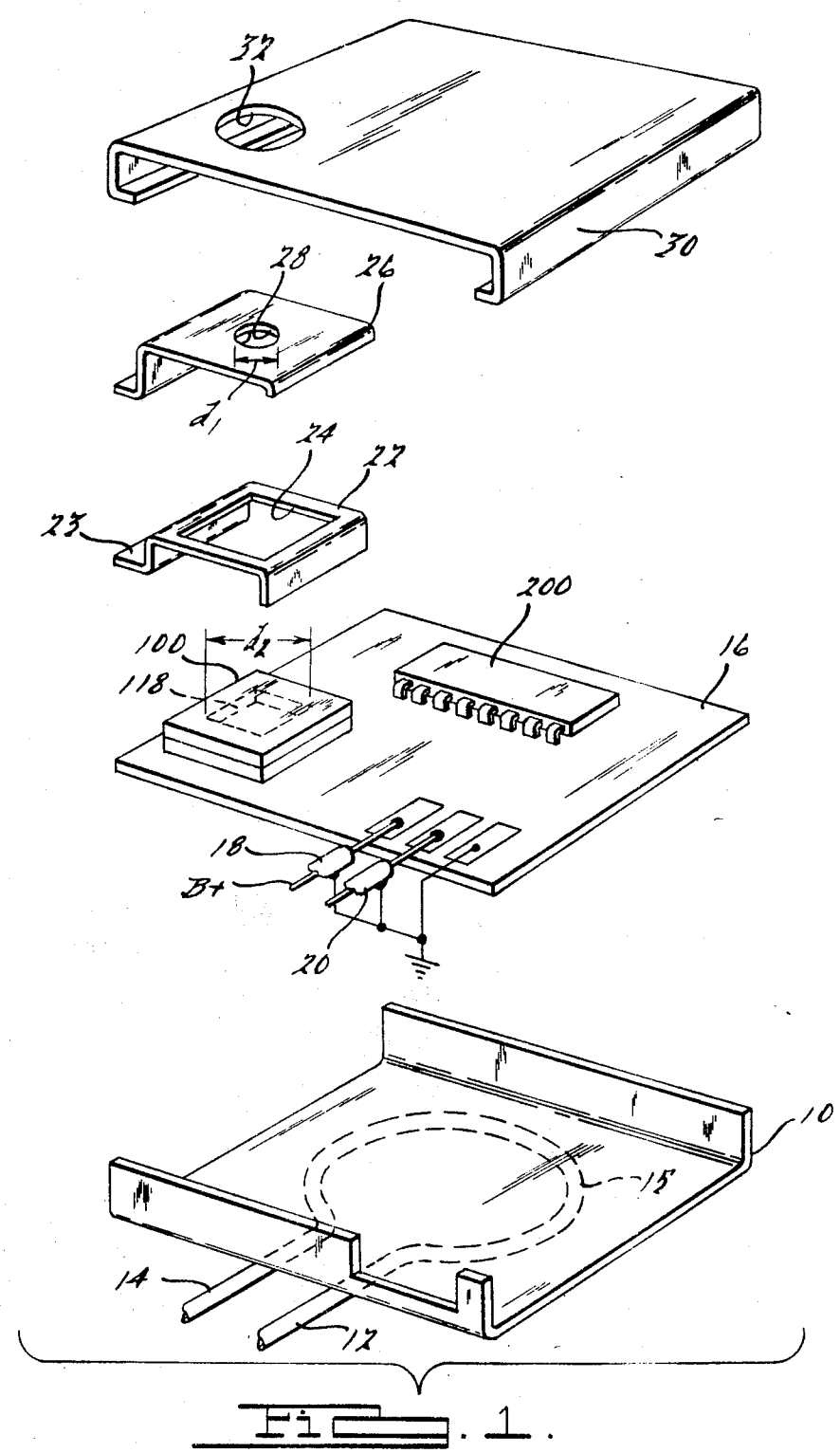
FIG. 1 is an exploded perspective view of the elements employed adjunct to the sensor of the present invention.

The actual sensor is designated as 100 in the figures and is provided within a protective housing illustrated in FIG. 1. The protective housing incorporates a base element 10 made of a heat conductive material, such as aluminum. A cooling coil 15 is provided that has an inlet 12 and an outlet 14 so as to pass coolant and dissipate heat away from the sensor. A printed circuit board 16, carrying the sensor 100, electronic circuitry 200 and appropriate heat sink conductors is mounted on the base element 10. B+ power is supplied to the printed circuit board 16 through a shielded conductor 18. The signal output from the circuitry 200 is provided on a shielded cable 20.

As can be better seen in the assembled cross-section of FIG. 2, a heat sink device 22 is mounted on the printed circuit board 16 so as to contact the exposed edges of the upper surface 117 of the sensor 100. The heat sink device 22 conducts excessive heat away from the sensor and to a grounded bus on the printed circuit board 16. A mask 26 is provided with a relatively small aperture 28 and is mounted above the sensor 100 so as to limit the exposure area on the exposed upper surface 117 of the sensor 100. A metal cover 30 is provided that attaches to the base element 10 so as to protect the printed circuit board from being coated with materials that are being deposited onto the sensor. An aperture 32 is defined in the cover 30 so as to provide an uninterrupted area for the coating materials impinging onto the exposed surface 117 of the sensor 100 through the mask aperature 28.

It should be noted that the sensor 100 is preferably a commercially available, variable capacitance pressure transducer such as that described in commonly assigned U.S. Pat. No. 4,261,086 (incorporated herein by reference). The desirability of using a commercially available pressure transducer enhances the reliability and allows for interchanging the sensor components when the coating samples are accumulated onto the exposed surface of the sensor to a thickness that is sufficient to decrease its sensitivity.

As shown in FIG. 2, sensor 100 is formed of a silicon semiconductor material 112 hermetically bonded to a glass dielectric material 114 along the interface 116. The silicon semiconductor material 112 is formed to define an evacuated space 118 having predetermined boundaries and, in the case of the embodiment shown in FIGS. 1 and 2, is a square area having a diagonal dimension "$d_2$". The semiconductor silicon layer 112 is doped so as to be conductive. Therefore the silicon layer 112 is utilized as one conductor of a sensor capacitor. The silicon layer 112 is connected via a conductive pin 128, formed in the glass substrate 114, to a conductor 17 on the printed circuit board 16.

A second electrical conductor 122 is formed on the upper surface 120 of the glass dielectric substrate 114 within the evacuated space 118 to define an uninterrupted common area of overlap. The conductor 122 is connected through a conductive pin 126, formed in the glass substrate 114, to a conductor 19 on the printed circuit board 16. The thickness between the lower surface 119 of the silicon layer 112 and the exposed upper surface 117 is much less than the thickness of the glass substrate 114. Therefore the silicon layer 112 provides a relatively flexible conductor membrane opposed to the relatively rigidly mounted conductor 122 across the evacuated space 118.

In the preferred embodiment, the heat sink element 22 has a relatively large aperture 24 and is mounted so as to contact the peripheral edges of the exposed surface 117 and to conduct heat away from the sensor. In the illustration shown in FIG. 2, the heat sink 22 is connected to the ground conductor 17, which is in turn connected to the housing.

The mask element 26 is superimposed above the heat sink 22 and is also attached to the heat sink and ground conductor 17 in order to provide additional heat protection. The aperture 28 formed in the mask 26 is shown as having a diameter "$d_1$" that is substantially less than $d_2$ dimension. The purpose of the smaller aperture 28 is to allow the vapor coating material "$S_p$" to be deposited on an area on the relatively flexible portion of the silicon layer 112 and away from the clamped immovable boundaries.

Figure 5:
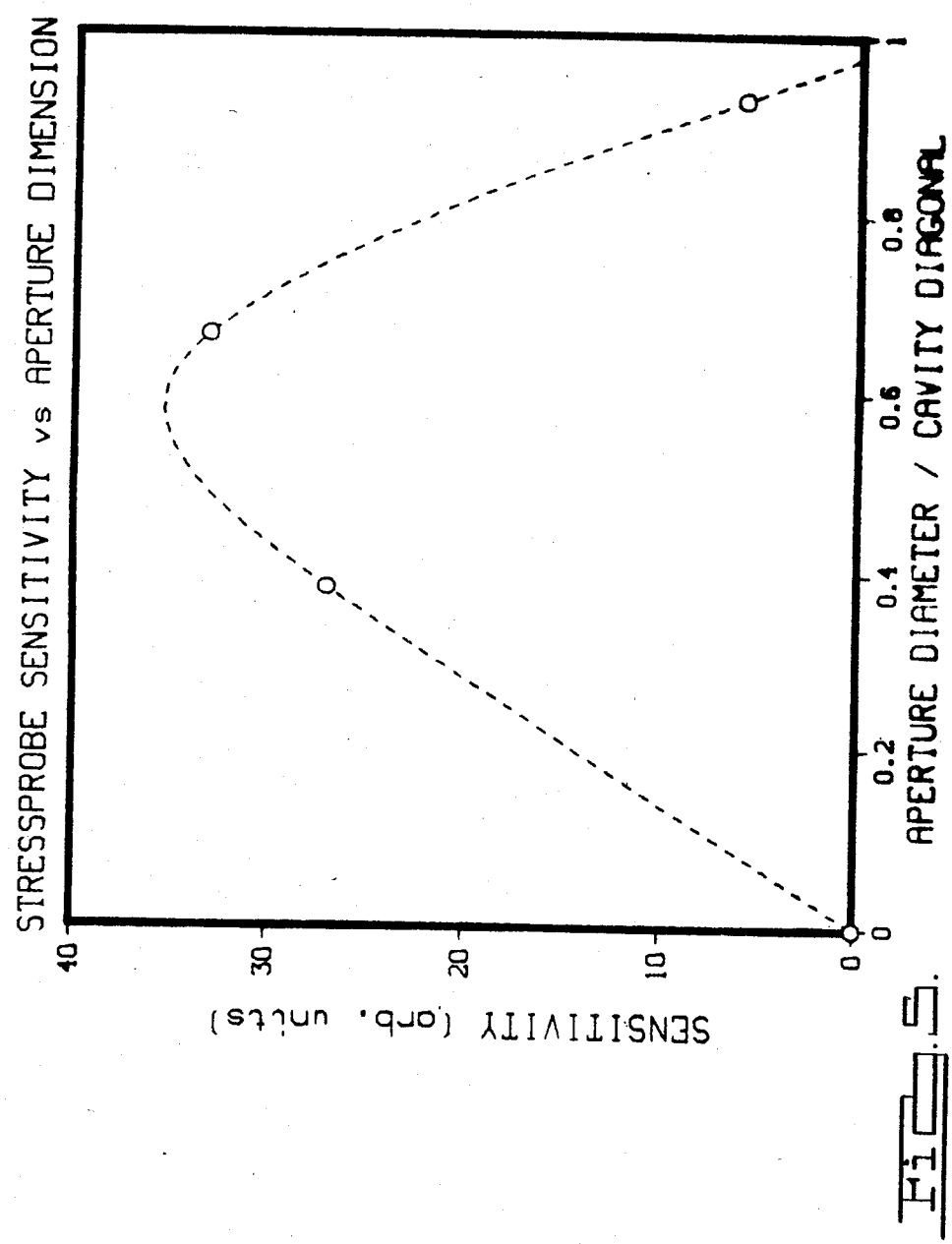
FIG. 5 is a plot of sensor sensitivity versus the ratio of mask size to cavity size.

In FIG. 5, a plot is shown of the relative sensitivity of the sensor with a $d_2$ chamber dimension for various $d_1$ sizes of mask apertures. As can be seen from the plot, the sensitivity peaks when the $d_1/d_2$ ratio is approximately 0.6 and has acceptable sensitivity in the range of $d_1/d_2$ ratios from 0.3 to 0.8.

The important relationship appears to be that the area exposed to receive vapor coatings on the upper flexible conductor must be less than and substantially within the corresponding evacuated space area defined by the bonding of the upper flexible conductor to the rigid substrate.

When employed within a vapor coating chamber, the device shown in FIG. 2 could be incorporated with a shutter (not shown) which would be used to time the exposure of the surface 117 of the sensor 100 to the coating material $S_p$.

In FIG. 3, the sensor 100 is schematically represented, with the apertured mask 26, in its electrical configuration. The sensor 100 serves as a variable tuning capacitor to a sensor oscillator 220, resident in the integrated circuit 200 shown in FIG. 1. A reference oscillator 230, utilizing a reference capacitor 232, provides a reference frequency to a mixer circuit 240. The difference in frequency between the two oscillators 220 and 230 is provided at the output of the mixer 240 to a divider circuit 250. The aforementioned portion of the circuit 200 is disclosed in commonly assigned U.S. Pat. No. 4,377,851 (incorporated herein by reference) and provides a square wave output signal "Pwa" as shown in FIG. 4.

At the appropriate partial pressures present in the vapor coating chamber, the square wave signal produced as Pwa is approximately 140 Hertz that has a cycle duration of approximately 70 nanoseconds. An AND gate 260 and a one shot multivibrator circuit 270 are provided to receive the Pwa signal. The one shot multivibrator is triggered by the negative going portion of the Pwa sqaure wave and provides a relatively high level signal "Pwb" having a known duration which is less than the full-cycle length of Pwa and greater than the half-cycle length of Pwa. Preferably, the output period of Pwb would be on the order of 75% of the cycle length of Pwa prior to coating depositions being made on the sensor 100. The output Pwb of the one shot multivibrator 270 is provided to the second input terminal of AND gate 260 so that when both signals are relatively high, an output signal "Pwa-Pwb" is generated having a pulse duration equal to the time that both signals are in their relatively high states. The output of the AND gate 260 is provided to a dectector filter 280 which accumulates the output signals and provides a rectified DC analog output level.

In a preferred in-situ use environment, the sensor 100 is placed in the approximate location that work pieces would normally be positioned to receive vapor coatings. The exposed, relatively flexible surface 117 of the sensor 100 receives the sputtered coating material. Any stresses present in the sputtering coating cause corresponding changes in the capacitance of the sensor 100. An increase in the analog output of the circuit 200 results when the stresses in the layer are under tension and a decrease in the analog output results when the stresses are in compression. Through periodic sampling and adjustments to the partial pressure of sputtering voltages, the coating stresses can be changed and monitored by the in-situ sensor 100 until such time as the desired stresses are measured. Utilizing the desired parameters, the chamber can then be used for production purposes to vapor deposit material coatings on work pieces. From time to time, it may be desirable to utilize the in-situ sensor to monitor the production and verify that the stresses present in the coatings are as desired.

The use of sensor 100 has been found to be highly desirable since the life of the sensor has been found to be highly accurate over several hundred cycles of tensile and compressive stress layers deposited on the exposed surface 17.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A sensor for measuring stresses present in deposited coatings of materials emitted from a vapor source comprising:
   first means defining a relatively rigid electrical conductor having a planar surface;
   second means defining a relatively flexible electrical conductor having a first generally planar surface opposing said first means across an evacuated space and a second generally planar surface for receiving said vapor deposition coatings;
   third means providing rigid support of said first and second means;
   said second and third means define the boundaries of an uninterrupted common area of separation between the electrical conductors defined by said opposing first and second means; and
   mask means disposed adjacent said second planar surface of said second means to limit the vapor deposited material being coated on said second planar surface by said vapor source to an area that is within the defined boundaries of the uninterrupted common area of separation between the electrical conductors defined by said first and second means.

2. A sensor as in claim 1, wherein said second means and said third means are hermetically bonded around said common area of separation to define the boundaries of said area.

3. A sensor as in claim 2, further including a circuit means electrically connected between said first and second means to measure changes in electrical capacitance which occur due to stresses present in vapor deposition material coatings on said second surface of said second means.

4. A sensor as in claim 3, wherein said circuit means includes a variable frequency oscillator which responsively provides an output frequency that reflects the value of electrical capacitance present between said first and second means.

5. A system for measuring the stresses present in material coatings made by vapor deposition, comprising:
   a capacitive sensor having a relatively flexible electrical conductor means with a first surface exposed to receive said deposition of material from a vapor coating source and a second unexposed surface, a relatively rigid electrical conductor means disposed across an evacuated space from said second surface of said relatively flexible electrical conductor and a support means for spacing said rigid electrical conductor means across said evacuated space and rigidly clamping the periphery of said relatively flexible electrical conductor about said evacuated space; and
   mask means oriented adjacent said exposed first surface of said relatively flexible electrical conductor to limit the area of deposition of material onto said exposed first surface to within a corresponding area defined by the underlying evacuated space.

6. A system as in claim 5, further including means connected to said relatively flexible electrical conductor means and said relatively rigid electrical conductor means of said capacitive sensor for monitoring changes in electrical capacitance between said conductor means when said material is deposited on said limited area of said exposed first surface of said relatively flexible electrical conductor.

7. A system as in claim 6, wherein said monitoring means includes a variable frequency oscillator connected to said capacitive sensor for providing an output signal having a frequency which reflects the electrical capacitance of said sensor.

8. A system as in claim 6, further including sink means located between said capacitive sensor and said mask means for conducting heat away from the exposed surface of said capacitive sensor.

* * * * *